Figure 1:
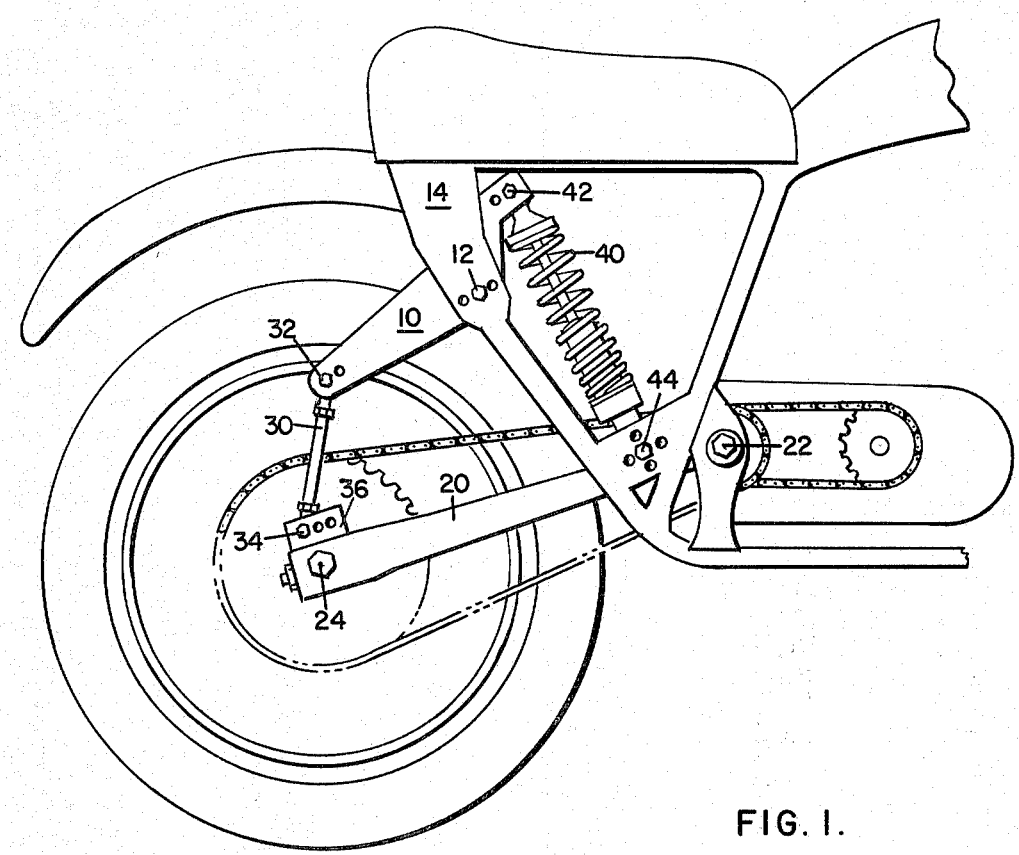

United States Patent [19]

Bolger

[11] 3,974,892

[45] Aug. 17, 1976

[54] MOTORCYCLE REAR WHEEL SUSPENSION

[76] Inventor: Joseph E. Bolger, Summer St., Barre, Mass. 01005

[22] Filed: May 12, 1975

[21] Appl. No.: 576,790

[52] U.S. Cl. .................................. 180/32; 280/284
[51] Int. Cl.² ........................................ B62K 25/02
[58] Field of Search .......... 280/284, 283, 285, 275, 280/286; 180/32

[56] References Cited

UNITED STATES PATENTS

| 1,047,430 | 12/1912 | Michaelson | 280/284 |
| 1,340,508 | 5/1920 | Walker | 280/284 |

FOREIGN PATENTS OR APPLICATIONS

| 104,022 | 2/1917 | United Kingdom | 280/284 |
| 200,288 | 7/1923 | United Kingdom | 280/284 |

*Primary Examiner*—Kenneth H. Betts
*Attorney, Agent, or Firm*—Ross, Ross & Flavin

[57] ABSTRACT

An articulated, rear wheel motorcycle suspension system including two rocking arms, each pivotally mounted between its forward and rearward terminals to the vehicle main frame, in the vertical plane of, and approximately parallel to, a trailing arm of the U-shaped swing arm assembly. Each rocking arm is linked adjacent its rearward extremity through a connecting link to the rearward extremity of the trailing arm therebeneath. The connecting link is pivotally attached at each of its ends, and linked adjacent its forward extremity to the vehicle main frame through a resilient, compressible, and dampened unit (shock absorber) which is pivotally attached at each of its ends.

1 Claim, 2 Drawing Figures

U.S. Patent   Aug. 17, 1976   3,974,892

MOTORCYCLE REAR WHEEL SUSPENSION

Motorcycle suspension development has received special consideration from designing engineers as greater and greater demands are being placed upon the machines, especially in the area of competition. The result has been to deemphasize horsepower and emphasize vehicle handling for the reason that power counts for nothing unless an operator can keep his vehicle properly aimed with its driving wheel against the ground.

Little has been done to assure softer, longer action from swing arm rear suspensions and the invention hereof is directed to new and useful improvements in this important area of motorcycle design in keeping with the present shift in focus away from engines and toward suspensions as a means of improving overall performance.

Motorcycles conventionally mount the rear wheel utilizing a swing arm, a U-shaped structure mounted pivotally at its closed end to the main frame, the wheel being mounted between the trailing arms of the U.

This invention is a system for controlling the movement of the ends of the swing arm, hence the rear wheel, to provide improved contact between the driving wheel and the ground, thereby increasing operator control of the motorcycle.

The conventional suspension method places resilient, compressible, and dampened suspension elements, shock absorbers, directly between the ends of the swing arm and the upper frame member. This configuration limits the travel of the system to the travel capabilities of the shock absorbers; that is, the length of travel is limited by the travel capacity of the shock absorbers used. Optimal travel is not available in currently-produced shock absorber units. Additionally, a longer travel unit placed in the conventional position would be either prohibitively massive or unduly susceptible to physical damage resulting from collision and from operational side-loading.

One common method for overcoming this deficiency in travel capacity is to move the lower shock absorber mount forward on the swing arm, providing the lower mount with a shorter moment arm than that of the wheel axle, thereby creating a longer travel arc for the axle than that of the lower mount, ergo a greater travel than the travel capacity of the shock absorber. But the disadvantage in such method is that it induces a bending stress on the swing arm, which therefore must be strengthened to contain it, hence made heavier, and it further induces an unusual vertical stress at the swing arm pivot, which therefore must likewise be reinforced, hence made heavier.

Other even less effective approaches engender such problems as: (1) operational side-loading of the dampened resilient members; (2) decreasing the mechanical advantage from a shortening of the operative moment arm as the extremes of travel are approached; and (3) exposure to collision damage.

Figure 2:
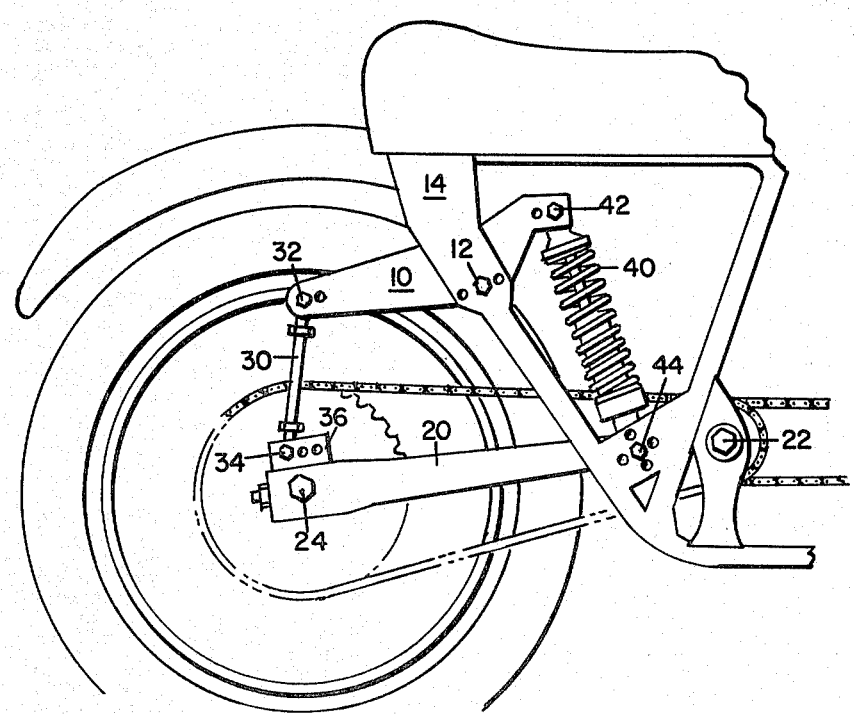

In the drawings:

FIG. 1 is a fragmentary view, in side elevation, showing a motorcycle with the apparatus of the invention associated therewith; and FIG. 2 is a fragmentary view, in side elevation, showing the dampening member of the FIG. 1 exemplification in the compressed state.

The preferred embodiment of the invention is shown as consisting of a rocking arm 10 pivotally mounted at 12, between its forward and rearward terminals, to the vehicle main frame 14, in the vertical plane of, and generally parallel to, the swing arm 20, which is pivoted at its forward end to the idler sprocket shaft 22 and contains at its rearward end to the rear wheel axle 24.

Alternatively, the rocking arms could be unitary in the respect that it was forklike with the forward end portion being formed of one piece and the pair of rearwardly facing trailing extremities could be spaced in parallelism as to each other.

It should be noted that, in both figures, only a single side of the various linkages and mechanisms are illustrated and that on the opposite side of the vehicle a mirror image exists of all of such various linkages and mechanisms.

Adjacent the rearward extremity of rocking arm 10, the upper end of a connecting link 30 is pivotally pinned at 32. The lower end of the connecting link is pivotally attached at 34 to an upstanding boss 36 projecting vertically upwardly from swing arm 20.

Adjacent the forward extremity of rocking arm 10, the upper end of a dampened suspension unit 40 is pivotally attached at 42. The lower end of the suspension unit is pivotally attached at 44 to the vehicle main frame.

Suspension unit 40 is in the form of a resiliently compressible and dampened assembly.

The invention has a capacity for adjustment to meet any specific requirements of any individual operator and to this end additional pivot pin openings are strategically provided, as shown.

The relationship of opposing forces — the input from the terrain transmitted through the wheel and the shock absober, i.e. the mechanical advantage — can be adjusted by changing the relationship of certain of the components.

For example, the position of lower connecting link pivot 34 can be varied. To move it in a forward direction is to lengthen the moment arm of the axle; thus wheel travel is increased relative to the travel of the shock absorber, the resiliency of which is accordingly decreased. And the converse is likewise true.

For example, the position of upper connecting link pivot 32 can be varied. To move it forward along the axis of rocking arm 10 is to shorten the moment arm of the axle, ergo wheel travel is decreased relative to the travel of the shock absorber, the resiliency of which is accordingly increased. And the converse is likewise true.

For example, the position of rocking arm pivot 12 may be moved relative to the axis of the rocking arm. To move it in a forward direction is to lengthen the moment arm of the axle, whereby wheel travel is increased relative to the travel of the shock absorber, the resiliency of which is accordingly decreased. And the converse is likewise true.

For example, the position of upper shock absorber pivot point 42 may be moved relative to the axis of the rocking arm. To move it in a forward direction is to lengthen the moment arm of the shock absorber, whereby wheel travel is decreased relative to the shock absorber travel, the resiliency of which is accordingly increased. And the converse is likewise true.

For example, lower shock absorber pivot point 44 may be moved relative to the axis of the shock absorber. To raise it is to raise the motorcycle; to lower it is to lower the motorcycle.

For example, the length of connecting link 30 may be varied. To lengthen it is to raise the vehicle; to shorten it is to lower the motorcycle.

For example, lower pivot 44 of the shock absorber may be moved relative to the horizontal axis of the frame. To move it horizontally is to change the mechanical advantage through the operational range of the system.

A plurality of pivot pin openings are provided at each area of jointure, as shown, for purposes of altering the relative geometry and therefor the action or behavior of the suspension system.

The system can be designed such that the various adjustments can be easily made by the operator, as desired.

The salient point of the system's capacity for adjustment is that, in addition to be capable of dampening and resiliency adjustments, it can also effect adjustments of the relative travel lengths of the axle and shock absorbers; that is, unlike conventional systems, the length of suspension travel at the rear wheel is not limited by the travel capabilities of the shock absorbers but can be much greater through the offered wide range of adjustments.

One salient object of the invention has been to provide for optimal response of the rear wheel to terrain irregularities and this has been realized by the inherent reduction of the reciprocating mass. The greatest mass is mounted on the vehicle main frame rather than on the reciprocating portions of the suspension system. That is, the shock absorber is mounted on the frame rather than on the swing arm and, as such, is not the reciprocating mass. Since only the relatively light connecting members reciprocate with the swing arm and wheel assembly, this inherent reduction of the inertia loading of the system allows the wheel to respond more accurately to terrain irregularities.

By virtue of the position of the dampening unit on the main frame, the shock absorber is shielded by the main frame and thus less exposed to damage from collision than in the conventional location between the ends of the swing arm and upper frames.

An additional salient advantage is realized in that, herewith, operational side-loading forces (which act other than along the shock absorber axis and by which the unit can be damaged since it is not designed to absorb same) are reduced by virtue of the increased adjustability of the mechanism. In essence, the side-loading forces can be restricted or minimized to within acceptable limits by the adjustments referred to above. In conventional suspension systems, these forces cannot be so limited.

With the invention hereof, the shock absorbers are not subject to the jarring forces of acceleration to which a unit conventionally mounted on a swing arm is subject. Its positioning on the sprung, suspended portion of the vehicle also lessens agitation and possible aeration of the oil (if an oil dampened suspension unit is used), which inhibits the operation of an oil-dampened unit.

I claim:

1. In a motorcycle including a front wheel and a driving rear wheel and an engine supporting main frame and a rear wheel swing arm assembly pivoted at its forward extremity to the main frame, the improvement in a rear wheel suspension system for selectively controlling the stresses inherent in contact between the driving wheel and ground during operation over rough terrain comprising:

a rocking arm having forwardly and rearwardly facing terminals and being pivoted intermediate its terminals and relative to the main frame in a selected one of a first plurality of pivotal points on the main frame for a rocking motion in the vertical plane of and generally parallel to the swing arm assembly, a connecting link having a lower extremity pivoted relative to the rearward extremity of the swing arm assembly in a selected one of a plurality of pivotal points on the swing arm assembly and having an upper extremity pivoted relative to the rearwardly facing terminal of the rocking arm in a selected one of a first plurality of pivotal points in the rocking arm, and a resiliently compressible and dampened suspension unit having a lower extremity pivoted relative to the main frame rearwardly of the pivotal interconnection of swing arm assembly and main frame in a selected one of a second plurality of pivotal points on the main frame and having an upper extremity pivoted relative to the forwardly facing terminal of the rocking arm in a selected one of a second plurality of pivotal points on the rocking arm.

\* \* \* \* \*